No. 786,640. Patented April 4, 1905.

UNITED STATES PATENT OFFICE.

OSCAR GROS AND JAKOB FRIEDLAENDER, OF LEIPSIC, GERMANY.

PROCESS OF PRODUCING CATALYZING PICTURES.

SPECIFICATION forming part of Letters Patent No. 786,640, dated April 4, 1905.

Application filed November 6, 1903. Serial No. 180,140.

*To all whom it may concern:*

Be it known that we, OSCAR GROS, doctor of philosophy and chemist, a subject of the German Emperor, and JAKOB FRIEDLAENDER, doctor of philosophy and chemist, a subject of the Emperor of Russia, both residents of Leipsic, in the Kingdom of Saxony, German Empire, have invented new and useful Improvements in Processes of Producing Catalyzing Pictures, of which the following is a full, clear, and exact specification.

In Letters Patent No. 770,533, dated September 20, 1904, is described a process for producing pictures from a silver negative by taking advantage of the catalyzing action of silver. It has now been found that when silver is used in this manner to decompose hydrogen peroxid by catalysis it gradually suffers deterioration as a catalyte. The cause of this change may consist, first, in the fact that the ethereal solution of hydrogen peroxid to be used always contains traces of acid and that the quantity of this acid remaining in the picture will be increased by repeatedly dipping the picture into the ethereal solution of hydrogen peroxid. By this increase by and by the silver will be changed. On the other hand, two chemical actions may coexist, especially in the presence of acid—viz., first, the principal reaction—that is to say, the catalytic decomposition of the hydrogen peroxid by the silver—and, secondly, an action of the hydrogen peroxid on the silver, by which action the changes of the silver mentioned above are produced. These coexisting reactions easily may cause inconveniences. Although this change in the silver may be delayed by exposing the silver negative or picture to ammonia-vapor, it is desirable to substitute for the silver a catalyte, which is more stable than silver under the conditions. As photographic negatives are generally produced in silver it is necessary to select a catalyte which can be produced by chemical change of the silver, so that the negative obtained as usual may be converted into a more stable form and then be used for printing by the process in question.

The present invention therefore consists in substituting a stable catalyte for the silver—for example, the higher oxygen compounds of manganese. For instance, the silver negative or picture may be treated with a solution of a manganic salt. Such solutions, however, are easily decomposed. Hitherto of the manganic salts which are relatively stable in solution only the manganic phosphate was known. This phosphate may be used for substituting for silver the higher oxygen compounds of manganese. Particularly suitable, however, are such manganic-salt solutions as are to be obtained in the following manner:

When a solution of a manganous salt is mixed with a solution of potassium permanganate, there is formed a brown precipitate, which is soluble in multivalent organic acids—for example, tartaric acid. There is thus obtained a red-brown to greenish solution, which rapidly decomposes, but may be rendered stable by adding alkali until the reaction is alkaline. Stable solutions are also obtained if the aforesaid brown precipitate is treated with salts of such organic acids. There are thus made dark alkaline solutions, which are stable for a long time.

For securing stability of the solutions the proportions must in all cases be so chosen that the finished solution contains an excess of an alkali salt of the anion of the manganic salt. These manganic-salt solutions are generally obtained in such a manner that the higher oxygen compounds of manganese or such manganese compounds as are capable of forming manganic compounds in the course of the further reaction are permitted to act upon multivalent organic acids or their salts. When no alkali is formed by the reaction, an alkali must be added, as it is essential to the stability of the solutions that they are alkaline.

The following are examples of how such stable solutions are prepared.

First. Manganic hydroxid is dissolved in an excess of tartaric acid and the solution is mixed with sodium hydroxid until the reaction is alkaline.

Second. A solution of tartaric acid is mixed with potassium permanganate in such proportion that there is an excess of tartaric acid, and sodium hydroxid is then added until the reaction is alkaline.

Third. A saturated solution of sodium tartrate is mixed with as much of the washed-out precipitate produced by mixing potassium permanganate and manganous-sulfate solutions, as it will dissolve. The liquid produced may be used directly for the purpose in question.

Fourth. A similar solution is made by mixing five (5) cubic centimeters of a solution of manganous sulfate of twenty-five (25) per cent. strength with forty (40) cubic centimeters of a saturated sodium-tartrate solution, twenty (20) cubic centimeters of a solution of sodium hydroxid of three (3) per cent. strength, and thirty (30) cubic centimeters of a solution of potassium permanganate of two (2) per cent. strength.

The substitution of a picture in manganese compound for that in silver may be effected, for example, by treating the silver picture with a solution of potassium ferricyanid, together with a manganic-salt solution of the kind hereinbefore described and some acid—for instance, hydrochloric acid—until the blackness has completely disappeared. The negative or picture is then washed for a short time and brought into a solution of potassium ferricyanid and sodium hydroxid. The picture now assumes a brown color. For example, suitable baths for operating in this manner are made as follows: First bath, three (3) cubic centimeters of a manganic solution prepared according to example four above, four-and-a-half (4.5) cubic centimeters of hydrochloric acid of three-and-six-tenths (3.6) per cent. strength, one hundred (100) cubic centimeters of a solution of potassium ferricyanid of two (2) per cent. strength; second bath, from ninety (90) to ninety-five (95) cubic centimeters of potassium-ferricyanid solution, from five (5) to ten (10) cubic centimeters of a solution of sodium hydroxid of four (4) per cent. strength. The picture thus obtained is well suited for catalytic multiplication by means of hydrogen peroxid. If after long use it loses its activity, this can easily be restored by treating the picture with ammonia-vapor.

What we claim is—

1. The process herein described of making catalyzing pictures of increased stability, which consists in substituting by chemical action for the unstable silver precipitate of the ordinary silver pictures the more stable precipitate of a higher oxygen compound of manganese.

2. The process herein described of making catalyzing pictures of increased stability, which consists in treating an ordinary silver-precipitate picture with a solution of potassium ferricyanid together with a manganic-salt solution and an acid, then washing the picture, and then subjecting the same to the action of a solution of potassium ferricyanid and sodium hydroxid.

In testimony that we claim the foregoing as our invention we have signed our names in presence of two subscribing witnesses.

OSCAR GROS.
JAKOB FRIEDLAENDER

Witnesses:
RUDOLPH FRICKE,
B. H. WARNER, Jr.